(12) United States Patent
Utsumi

(10) Patent No.: US 9,571,676 B2
(45) Date of Patent: Feb. 14, 2017

(54) IMAGE FORMING APPARATUS, CONTROL METHOD FOR IMAGE FORMING APPARATUS, AND STORAGE MEDIUM

(75) Inventor: Yuichi Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 13/132,236

(22) PCT Filed: Dec. 14, 2009

(86) PCT No.: PCT/JP2009/006832
§ 371 (c)(1),
(2), (4) Date: Jun. 1, 2011

(87) PCT Pub. No.: WO2010/070860
PCT Pub. Date: Jun. 24, 2010

(65) Prior Publication Data
US 2011/0235135 A1    Sep. 29, 2011

(30) Foreign Application Priority Data

Dec. 17, 2008   (JP) ................................. 2008-321635

(51) Int. Cl.
*G06K 15/00*  (2006.01)
*H04N 1/00*  (2006.01)
*H04N 1/40*  (2006.01)

(52) U.S. Cl.
CPC ...... *H04N 1/00347* (2013.01); *H04N 1/00915* (2013.01); *H04N 2201/0081* (2013.01); *H04N 2201/0087* (2013.01); *H04N 2201/218* (2013.01); *H04N 2201/3295* (2013.01)

(58) Field of Classification Search
USPC .................................................. 358/404, 444
See application file for complete search history.

(56) References Cited

U.S. PATENT DOCUMENTS

| 4,475,161 | A | * | 10/1984 | Stock ............................. 345/604 |
| 4,754,428 | A | * | 6/1988 | Schultz et al. ................. 709/246 |
| 5,105,266 | A | * | 4/1992 | Telle ............................. 358/518 |
| 5,220,438 | A | | 6/1993 | Yamamoto |
| 5,335,085 | A | * | 8/1994 | Nakatsuma ................... 358/404 |
| 5,363,206 | A | | 11/1994 | Fukushima |
| 5,559,933 | A | * | 9/1996 | Boswell ...................... 358/1.15 |
| 5,631,745 | A | * | 5/1997 | Wong et al. .................. 358/434 |
| 5,706,037 | A | * | 1/1998 | McIntyre .......................... 347/3 |
| 5,724,490 | A | * | 3/1998 | Shibaki .............. H04N 1/32358  358/1.15 |
| 5,737,503 | A | * | 4/1998 | Mitani ................... G06K 15/02  358/1.16 |

(Continued)

FOREIGN PATENT DOCUMENTS

| CN | 101262540 A | 9/2008 |
| EP | 876051 A2 | 11/1998 |

(Continued)

*Primary Examiner* — Madelein Nguyen
(74) *Attorney, Agent, or Firm* — Canon U.S.A., Inc. IP Division

(57) ABSTRACT

An image forming apparatus stores image data generated from a document scanned by a scanner on a removable medium. When storage on the removable medium is not completed, part of the image data that has been stored by that time is deleted from the removable medium.

7 Claims, 9 Drawing Sheets

(56) References Cited

U.S. PATENT DOCUMENTS

| | | | |
|---|---|---|---|
| 5,774,758 A * | 6/1998 | Takahashi | G03G 15/6538 358/296 |
| 5,813,009 A * | 9/1998 | Johnson et al. | 707/695 |
| 5,870,535 A * | 2/1999 | Duffin et al. | 358/1.16 |
| 5,889,578 A * | 3/1999 | Jamzadeh | 355/41 |
| 5,987,230 A * | 11/1999 | Shimizu | G06K 15/00 358/1.16 |
| 6,052,201 A * | 4/2000 | Shibaki et al. | 358/1.16 |
| 6,064,489 A * | 5/2000 | Nosaki et al. | 358/1.13 |
| 6,261,010 B1 * | 7/2001 | Maeda | 400/76 |
| 6,317,193 B2 * | 11/2001 | Funahashi | 355/40 |
| 6,317,217 B1 * | 11/2001 | Toda | 358/1.11 |
| 6,348,974 B1 * | 2/2002 | Takahashi et al. | 358/1.16 |
| 6,437,874 B1 * | 8/2002 | Shibaki et al. | 358/1.15 |
| 6,570,667 B1 * | 5/2003 | Hattori et al. | 358/1.15 |
| 6,611,347 B1 * | 8/2003 | Okada | G06K 15/02 358/1.15 |
| 6,621,592 B1 * | 9/2003 | Takayama et al. | 358/1.16 |
| 6,813,038 B1 * | 11/2004 | Kadowaki | G06F 3/1217 358/1.1 |
| 6,876,466 B1 * | 4/2005 | Morikawa et al. | 358/1.17 |
| 6,965,404 B2 * | 11/2005 | Hosoda | G03B 17/48 348/207.2 |
| 6,987,582 B1 * | 1/2006 | Atsumi | G03G 15/60 358/1.6 |
| 7,684,064 B2 * | 3/2010 | Kimura | G06F 3/1222 358/1.14 |
| 7,751,635 B2 * | 7/2010 | Clark | G06T 9/007 341/65 |
| 7,852,502 B2 * | 12/2010 | Horiyama | G06F 3/1203 358/1.13 |
| 8,035,842 B2 * | 10/2011 | Kouchi et al. | 358/1.16 |
| 8,225,195 B1 * | 7/2012 | Bryar et al. | 715/206 |
| 8,255,640 B2 * | 8/2012 | Hodge et al. | 711/154 |
| 2001/0013926 A1 * | 8/2001 | Funahashi | G06K 15/00 355/40 |
| 2001/0029510 A1 * | 10/2001 | Tokui | 707/200 |
| 2001/0043725 A1 * | 11/2001 | Ueda | 382/115 |
| 2002/0001100 A1 * | 1/2002 | Kawanabe | 358/1.15 |
| 2002/0049723 A1 * | 4/2002 | Kurihara et al. | 707/1 |
| 2002/0118285 A1 * | 8/2002 | Misawa et al. | 348/208.16 |
| 2003/0152265 A1 * | 8/2003 | Asamura et al. | 382/162 |
| 2004/0136597 A1 * | 7/2004 | Hara et al. | 382/232 |
| 2005/0289460 A1 * | 12/2005 | Tomita et al. | 715/530 |
| 2006/0109493 A1 * | 5/2006 | Toda | H04N 1/2187 358/1.13 |
| 2006/0132821 A1 * | 6/2006 | Nonaka | H04N 1/00127 358/1.13 |
| 2007/0086041 A1 * | 4/2007 | Richtsmeier | 358/1.15 |
| 2007/0121161 A1 | 5/2007 | Yamada | |
| 2007/0126888 A1 | 6/2007 | Yen | |
| 2007/0186032 A1 * | 8/2007 | Sinclair et al. | 711/103 |
| 2007/0188834 A1 | 8/2007 | Nakamura et al. | |
| 2007/0230253 A1 * | 10/2007 | Kim | 365/185.29 |
| 2007/0288677 A1 * | 12/2007 | Mambakkam et al. | 710/301 |
| 2008/0074683 A1 * | 3/2008 | Yanamura et al. | 358/1.2 |
| 2008/0144100 A1 * | 6/2008 | Tomii et al. | 358/1.15 |
| 2008/0204804 A1 * | 8/2008 | Yamada | H04N 1/2104 358/1.15 |
| 2009/0210612 A1 * | 8/2009 | Nakanishi et al. | 711/103 |
| 2009/0219562 A1 * | 9/2009 | Hasegawa | 358/1.15 |
| 2009/0262371 A1 * | 10/2009 | Nakano | 358/1.9 |
| 2009/0273615 A1 * | 11/2009 | Ohnishi | 345/690 |
| 2010/0138624 A1 * | 6/2010 | Seki et al. | 711/165 |
| 2010/0205504 A1 * | 8/2010 | Fung et al. | 714/752 |
| 2011/0022778 A1 * | 1/2011 | Schibilla et al. | 711/103 |
| 2011/0050913 A1 * | 3/2011 | Kim | 348/207.1 |
| 2011/0052069 A1 * | 3/2011 | Nakabayashi et al. | 382/190 |
| 2011/0072196 A1 * | 3/2011 | Forhan et al. | 711/103 |
| 2012/0023285 A1 * | 1/2012 | Kim | 711/103 |
| 2013/0198521 A1 * | 8/2013 | Wu | 713/175 |

FOREIGN PATENT DOCUMENTS

| | | |
|---|---|---|
| EP | 1659771 A2 | 5/2006 |
| JP | 8-0336022 A | 12/1996 |
| JP | 2003-61029 A | 2/2003 |
| JP | 2003-234881 A | 8/2003 |
| JP | 2007-096931 A | 4/2007 |
| JP | 2008-118333 A | 5/2008 |

* cited by examiner

IMAGE FORMING APPARATUS, CONTROL METHOD FOR IMAGE FORMING APPARATUS, AND STORAGE MEDIUM

TECHNICAL FIELD

The present invention relates to an image forming apparatus that can save image data onto an external storage device such as a universal serial bus (USB) memory or a memory card that can be removably connected to the image forming apparatus.

BACKGROUND ART

A multifunction peripheral (MFP) is one type of image forming apparatus that has multiple functions such as a printer function, a copy function, a facsimile (FAX) function, and a scanner function. Some MFPs have insertion slots that conform to standards common to other peripheral devices, and removable media such as USB memories and memory cards can be mounted and connected as external storage devices to these MFPs. Removable media collectively represent portable memory media that can be freely connected or disconnected and that have semiconductor memories or magnetic discs as storage media, such as USB memories, various memory cards, or the like.

These image forming apparatuses can print or send, via facsimile, information stored on removable media connected to the insertion slots. Also, image data generated by performing a scan can be stored on removable media. These functions do not require other devices such as PCs. Therefore, removable media are highly convenient.

In general, when image data generated by performing a scan is to be stored on a removable medium, image data generated by performing a scan is transferred and stored while performing a scan. The size of image data generated by performing a scan is not known until scanning of one page is completed. Therefore, there may be no space available in the storage region of the removable medium at the time the image data is being stored after scanning is completed. That is, a memory full error may occur.

When a memory full error occurs in a removable medium, the user must restart a scan from the beginning after organizing files or bringing a new removable medium in order to increase the available space in the removable medium.

To overcome this problem, for example, the following apparatus is proposed. When a memory full error occurs in a removable medium, if data to be stored is held in the apparatus and a new removable medium is connected to the apparatus, the held data is saved in the connected removable medium (e.g., Japanese Patent Laid-Open No. 2008-118333).

Accordingly, the user can store the image data on the newly mounted removable medium, without performing again a scan from the beginning.

As described above, a process of storing image data onto a removable medium may be interrupted and may not be completed, such as when a memory full error occurs in the removable medium. In such a case, part of image data stored on the removable medium is left in the removable medium. For example, when a memory full error occurs when the fourth page in a document including five pages is being stored, scanned image data for three pages and image data for part of the fourth page are left stored on the removable medium. In this case, the image data is stored in an incomplete format, such as that the property of an application that handles a file including the image data is unknown, or the name of the file is unknown. Thus, a computer cannot analyze the file, and hence, the user cannot easily check an image included in the file. That is, data that cannot be easily handled by the user is stored. In other words, data unnecessary for the user is left in the storage medium, unless the user becomes aware of the data and deletes the data.

CITATION LIST

Patent Literature

PTL 1: Japanese Patent Laid-Open No. 2008-118333

SUMMARY OF INVENTION

The present invention provides an image forming apparatus that prevents unnecessary data from being left in a removable medium when data is to be stored onto the removable medium.

According to an aspect of the present invention, there is provided an image forming apparatus including the following elements: a scanning unit configured to scan a document; a connection unit configured to connect a removably connectable storage device; a storage unit configured to store image data generated from the document scanned by the scanning unit in the storage device connected by the connection unit; and a deleting unit configured to delete, in a case where storage performed by the storage unit is not completed, part of the generated image data that has been stored by the storage unit by that time from the storage device.

Further features of the present invention will become apparent from the following description of exemplary embodiments with reference to the attached drawings.

DESCRIPTION OF EMBODIMENTS

Hereinafter, embodiments of the present invention will be described using the drawings.

First Embodiment

Figure 1:
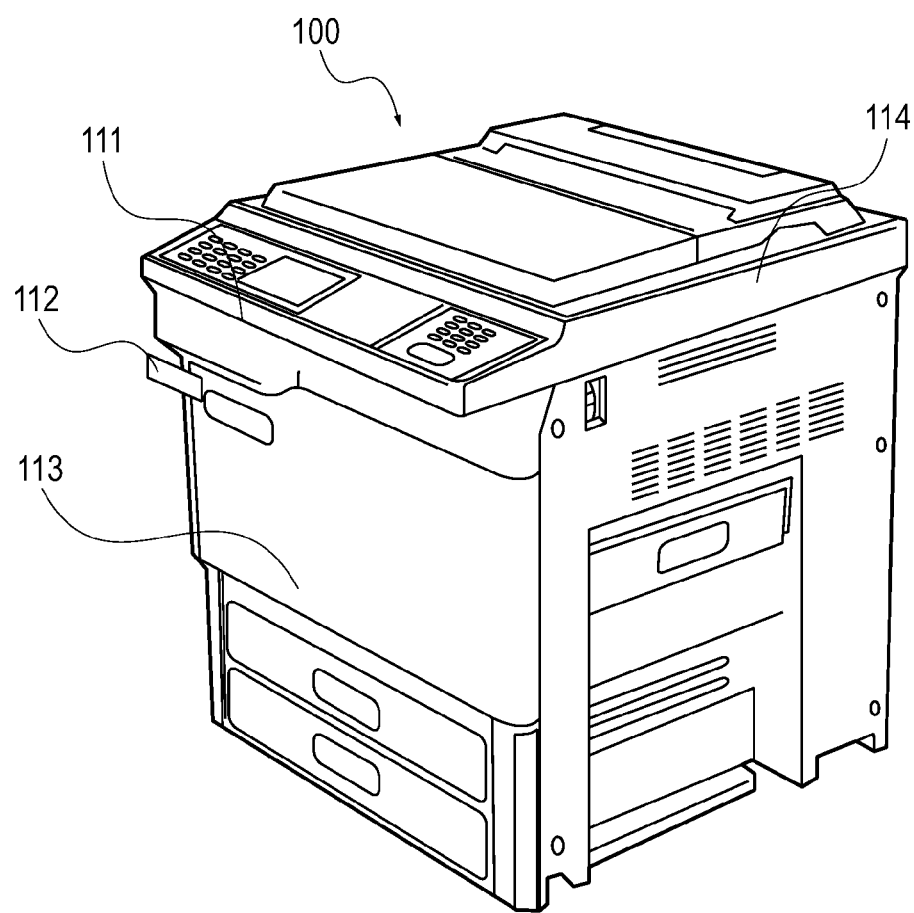
FIG. 1 is a perspective view of the structure of an image forming apparatus according to an embodiment of the present invention.

FIG. 1 is a perspective view illustrating the structure of an image forming apparatus according to an embodiment of the present invention. FIG. 1 illustrates an exemplary structure of an MFP according to an embodiment of the present invention. The printing method of the MFP is not limited to electrophotography such as a laser beam printer, and the MFP may use any other printing method. Although the MFP will be described in the present embodiment as an example of the image forming apparatus according to an embodiment of the present invention, other apparatuses may serve as the image forming apparatus. For example, a scanner without a printer may serve as the image forming apparatus.

An MFP 100 in the present embodiment is an apparatus to which a removable medium such as a USB memory or a memory card can be removably connected and mounted as an external storage device. Image data generated from a document scanned by a scanner included in the MFP 100 can be stored on the connected removable medium. Also, image data stored on the connected removable medium can be obtained and printed by a printer included in the MFP 100.

The MFP 100 includes a removable medium interface (I/F) 112 that is a USB insertion slot or a card reader section. By connecting a removable medium such as a USB memory to the removable medium I/F 112, information (data) stored in the external storage device and the MFP 100 can be bidirectionally sent/received between the external storage device and the MFP 100.

The MFP 100 includes an operation panel 111. The operation panel 111 includes an operation unit that accepts entries of data such as various instructions, characters, numerals, and the like, which are entered by performing a user operation, and a display that displays information regarding an instruction menu for the user, obtained images, and the like.

The MFP 100 includes a scanner section 114 that optically scans a document and generates image data, and a printer section 113 that prints an image on a recording sheet on the basis of image data.

Figure 2:
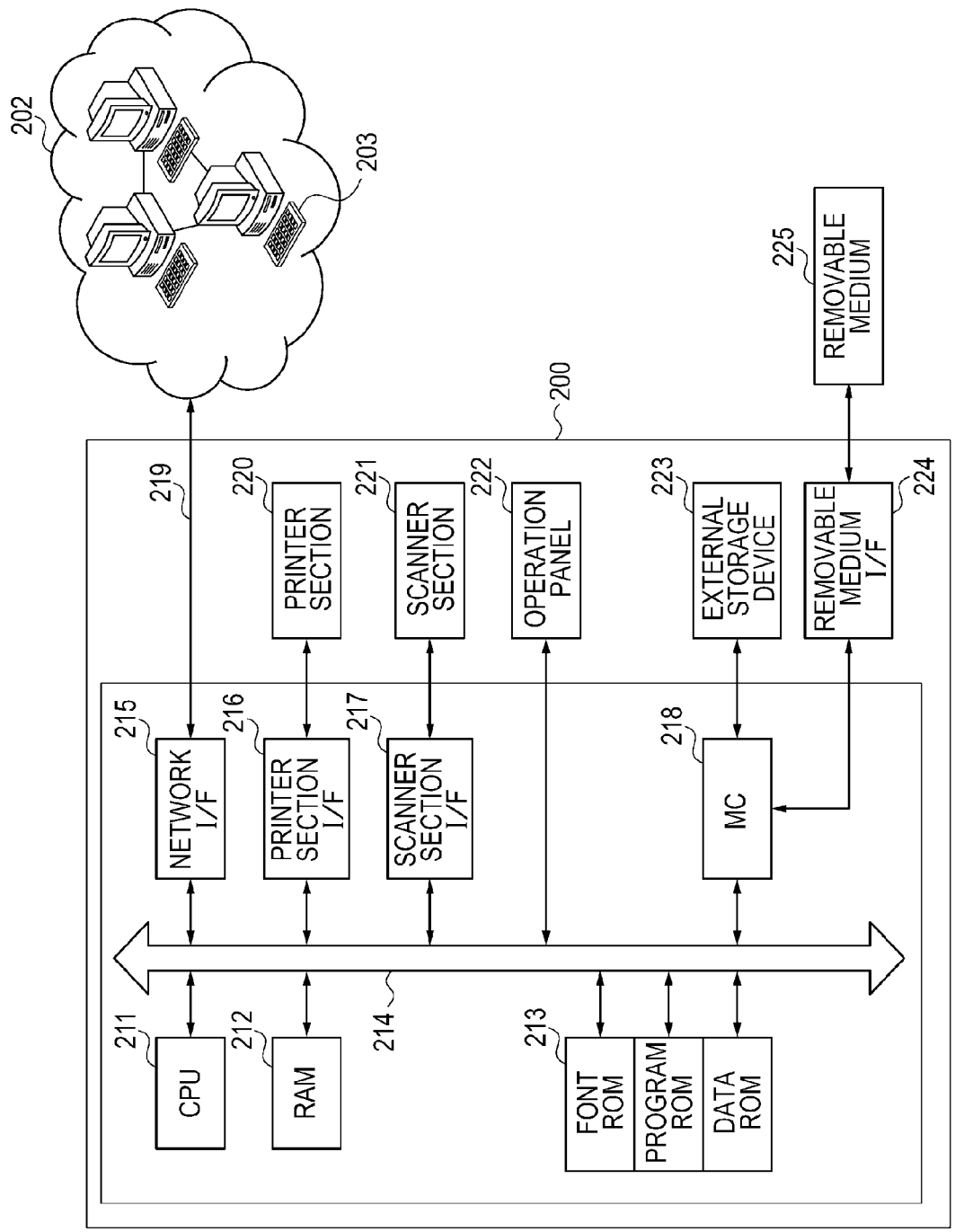
FIG. 2 is a block diagram of the hardware structure of an image forming apparatus illustrated in a first embodiment of the present invention.

FIG. 2 is a block diagram illustrating the hardware structure of the MFP 100 in the present embodiment.

The MFP 100 illustrated in FIG. 2 includes a central processing unit (CPU) 211. The CPU 211 controls, as a whole, access established by various devices connected to a system bus 214 on the basis of a control program stored on a read-only memory 213 (ROM) 213 or a control program stored in an external storage device 223 such as a hard disk. The CPU 211 outputs an image signal serving as output information to a printer section (printer engine) 220 connected via a printer section I/F 216 to the system bus 214. Also, the CPU 211 processes input information from a scanner section (scanner engine) 221 connected via a scanner section I/F 217 to the system bus 214. A program ROM included in the ROM 213 may store control programs for the MFP 100, which are executed by the CPU 211, such as those illustrated in flowcharts described later in the present embodiment.

A font ROM included in the ROM 213 stores font data or the like used at the time the foregoing output information is generated. A data ROM included in the ROM 213 stores information or the like used on a host computer 203 when the MFP 100 includes no hard disk 223.

The CPU 211 can communicate with the host computer 203 via a network I/F 215 and can notify the host computer 203 of information in the printer or the like. Also, the network I/F 215 is connected to a network communication channel 219 and can access the Internet 202.

A random-access memory (RAM) 212 functions as a main memory, a work area, or the like for the CPU 211. The memory capacity of the RAM 212 can be increased by connecting an optional RAM to an expansion port (not illustrated).

The RAM 212 is a memory section used as an output information expanding area, an environmental data storage area, or a nonvolatile random-access memory (NVRAM). A memory controller (MC) 218 controls accessing the hard disk 223 including, for example, the foregoing hard disk (HD) or a memory card from other hardware.

The hard disk 223 is a memory section that is optionally connected and stores font data, an emulation program, and form data. The number of external memories including the hard disk 223 is not limited to one, and at least one external memory can be included. Besides internal fonts, the hard disk 223 can store an optional font card and programs that analyze printer control languages in different language systems.

An operation panel 222 includes switches for entering operations, a light-emitting diode (LED) display, and the like. The operation panel 222 may further include an NVRAM (not illustrated) and store printer mode setting information from the operation panel 222. A document scanner section 221 scans a document or the like and generates image data as an output via the scanner section I/F 217.

The network communication channel 219 (e.g., Ethernet) can communicate with the host computer 203 using a predetermined protocol such as Transmission Control Protocol/Internet Protocol (TCP/IP).

A removable medium I/F 224 is a USB insertion slot or a card reader section. The removable medium I/F 224 includes a detector that detects whether a removable medium 225 is connected. The removable medium (external storage device) 225 stores information such as image data. The removable medium I/F 224 further includes a function of detecting the connecting state of the removable medium 225 and notifying the CPU 211 thereof. The CPU 211, which has been notified thereof, controls a function using the removable medium 225. For example, the CPU 211 controls a function (direct print) of directly reading image data stored on the removable medium 225 and printing the image data using the printer section 220. Also, the CPU 211 controls a function (scan to medium) of saving information (e.g., image data) from the scanner section 221 on the removable medium 225. Also, the CPU 211 controls displaying of these functions using the removable medium 225 on the operation panel 222. The card reader section included in the removable medium I/F 224 includes memory slots corresponding to multiple standardized media. Therefore, the present invention is applicable when image data can be read/written by using, for example, a secure digital (SD) memory, a CompactFlash, a memory stick, or a flash memory, instead of a memory card.

Referring now to FIGS. 3 to 7, the flow of a process of a function of storing scanned image data on a removable medium in the image forming apparatus according to the embodiment of the present invention will be described.

Figure 3:
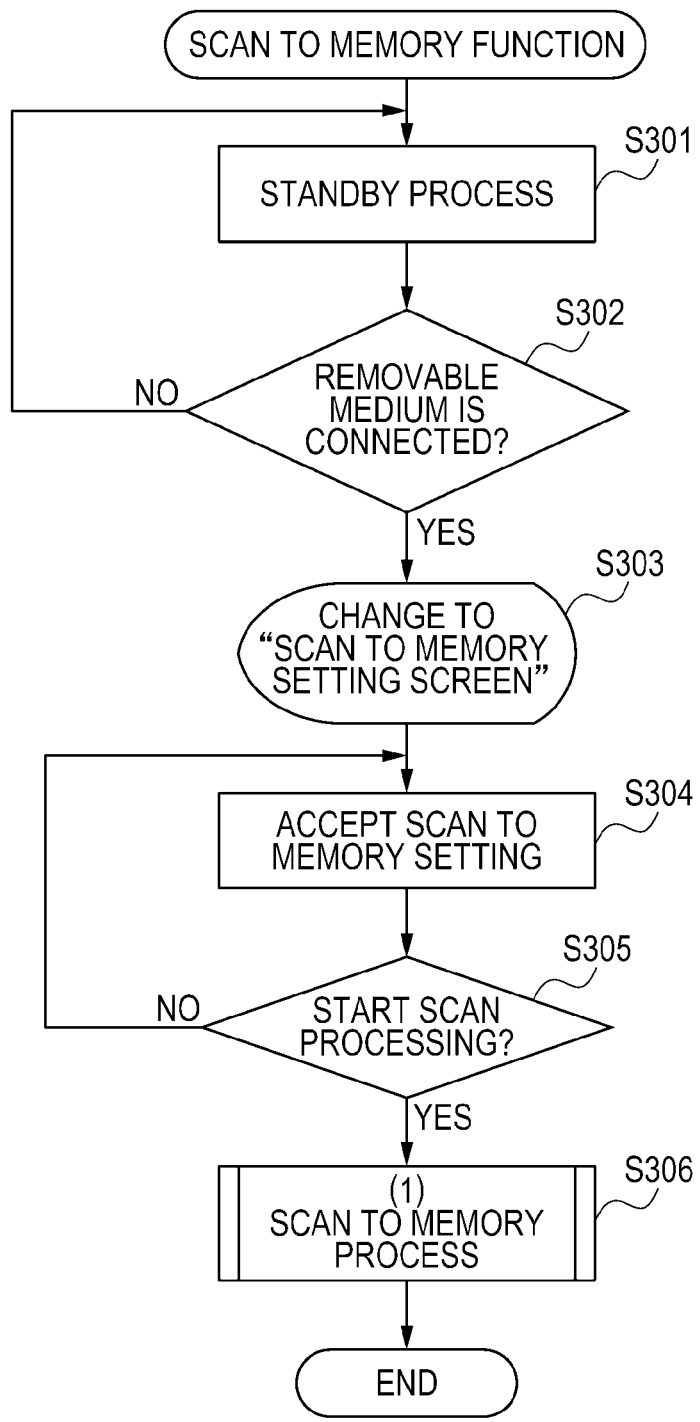
FIG. 3 is a flowchart illustrating a process of controlling a scan to memory function in the first embodiment of the present invention.

FIG. 3 is a flowchart illustrating a process of controlling a scan to memory function of storing image data generated by a scanner of the image forming apparatus onto a removable medium. Steps S301 to S306 represent individual steps, and the individual steps are realized by loading, with the CPU 211 illustrated in FIG. 2, a control program stored on the ROM 213 or the external storage device 223 onto the RAM 212 and executing the control program. Individual steps of processes illustrated in FIGS. 4 to 7 described later are also executed by the CPU 211 of the MFP 100.

Figure 8:
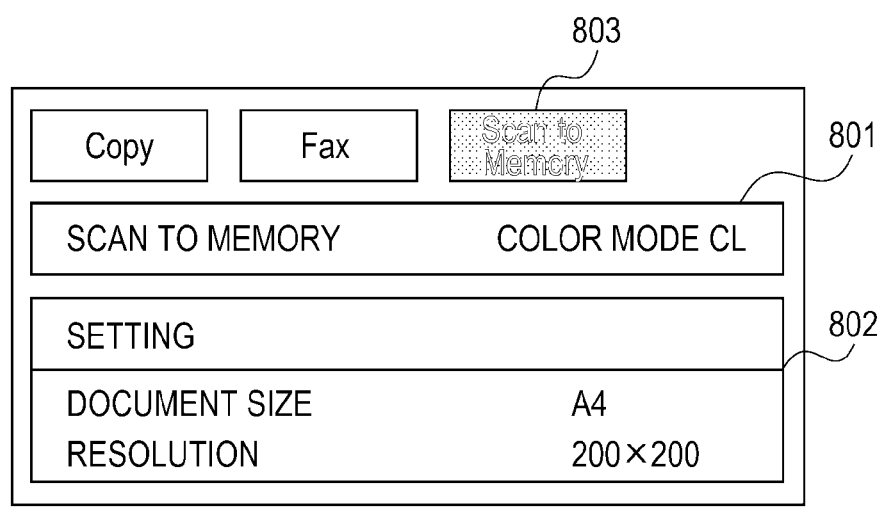
FIG. 8 is an illustration of an example of a screen displayed on an operation panel of the image forming apparatus illustrated in the first embodiment of the present invention.

When a removable medium is connected to the MFP 100, the CPU 211 detects this connection (S302), and changes what is displayed on the operation panel 222 to a scan to memory setting screen (S303). FIG. 8 illustrates an example of a scan to memory setting screen displayed on the operation panel 222 of the MFP 100. A portion 801 illustrated in FIG. 8 indicates that the MFP 100 is currently in the scan to memory function mode. Also, a portion 802 indicates setting values in the currently set scan setting. Until a removable medium is inserted, as illustrated in step S301, the CPU 211 is executing a standby process. In a first embodiment, connection of a removable medium is detected, and then the screen of the operation panel 222 is changed. However, the screen may be changed to the scan to memory setting screen in response to a key input entered by a user. In that case, the screen is changed to the scan to memory setting screen when a button illustrated in a portion 803 in FIG. 8 is pressed.

When the user wishes to execute the scan to memory function, the user performs various scan settings, saving file format setting, and the like on the changed setting screen (S304). For example, the scan settings include settings of a document sheet size, a scanning resolution, a color mode, a document type, and color coordination.

When the user completes the settings, the user sets a document on an auto document feeder (ADF) or a book scanning glass plate (flat document scanning glass plate) and gives a scan starting instruction. Upon receipt of the scan starting instruction from the user (YES in step S305), the MFP 100 changes the flow to a scan to memory process (S306). The details of the scan to memory process (S306) will be described later using FIG. 4. When the scan to memory process (S306) is terminated, a series of processes in the scan to memory function is terminated.

Figure 4:
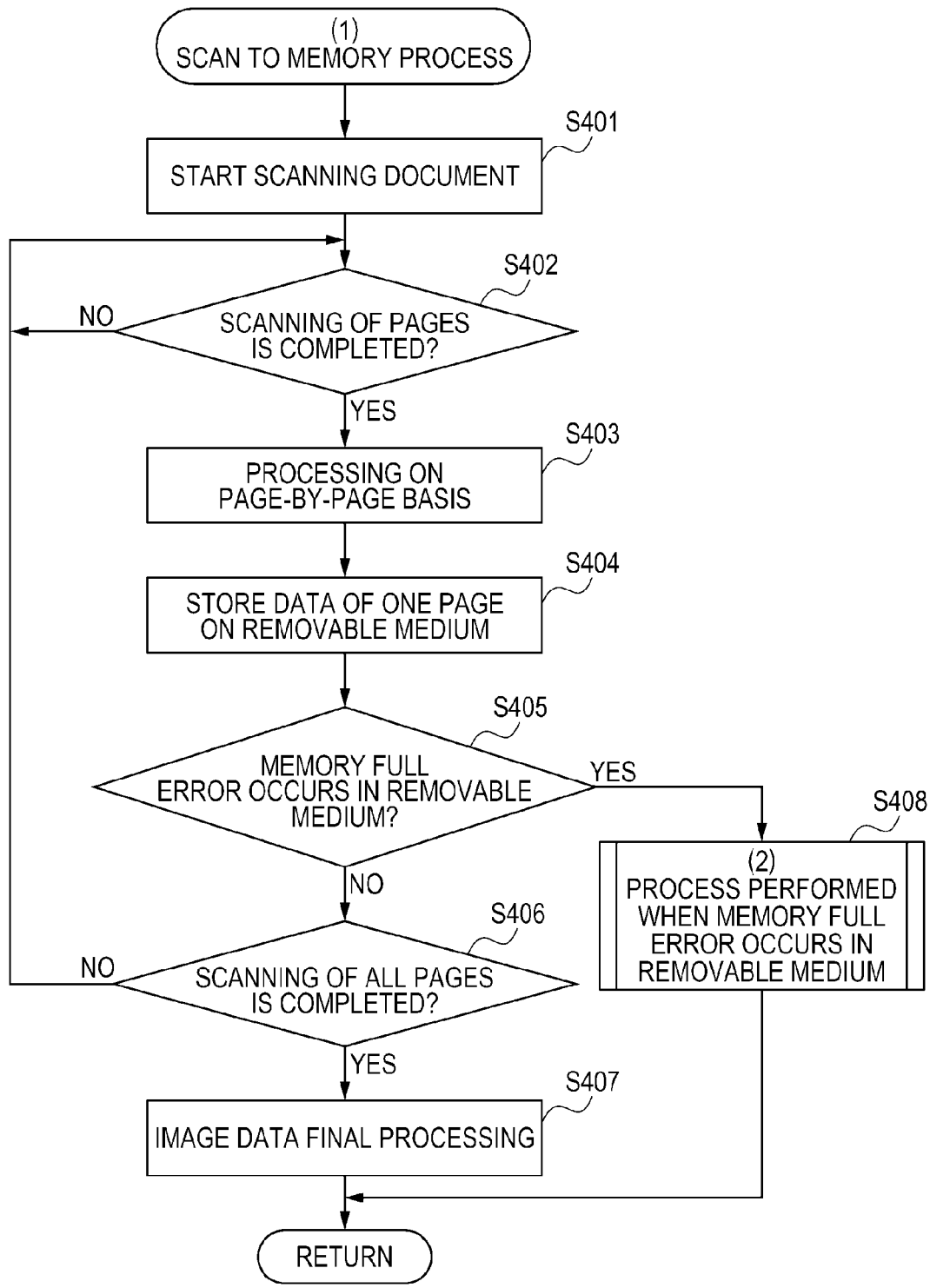
FIG. 4 is a flowchart illustrating a process of controlling the scan to memory function in the first embodiment of the present invention.

Referring now to FIG. 4, the details of the scan to memory process will be described. Continued from step S306 in FIG. 3, the MFP 100 processes, on a page-by-page basis, images scanned on the ADF or the book scanning mount (S401 to S403). Processing on a page-by-page basis represents a process of generating image data by encoding the scanned document or converting the file format to a file format specified by the user. When scanning of one page is completed and when processing of that page is completed, the MFP 100 stores image data of that page in the removable medium (external memory) 225 via the MC 218 and the removable medium I/F 224 (S404).

The case where the user designates storage in a multi-page format will be described. For example, tagged image file format (TIFF), which is one type of image data format, allows multiple pages as a multi-page TIFF in one file. In this case, a target file cannot be generated unless scanning of all pages is completed. In the present embodiment, a method of converting image data on a page-by-page basis into the TIFF format, and storing the converted image data as a temporary file on a removable medium will be described. This method is a method of, every type a page is scanned, generating a file of image data in accordance with the TIFF file format and storing each page as a different file on a removable medium. When image data is stored on a removable medium on a page-by-page basis, image data of all pages need not be accumulated in the MFP 100. Therefore, the capacity needed in the RAM 212 of the MFP 100 can be reduced.

When image data of each page is to be stored, whether a memory full error is occurring in the removable medium is determined (S405). When no memory full error occurs (NO in S405) and when scanning of all pages is completed (YES in S406), the image data stored on the removable medium is subjected to final processing in accordance with the file format specified by the user (S407). The final processing is, for example, adding header information and checking the file name (file extension).

In contrast, when a memory full error in the removable medium is detected while image data is being stored on the removable medium on a page-by-page basis (YES in S405), the flow proceeds to a process performed when a memory full error occurs (S408). This process performed when a memory full error occurs will be described in detail later using FIG. 5.

Figure 5:
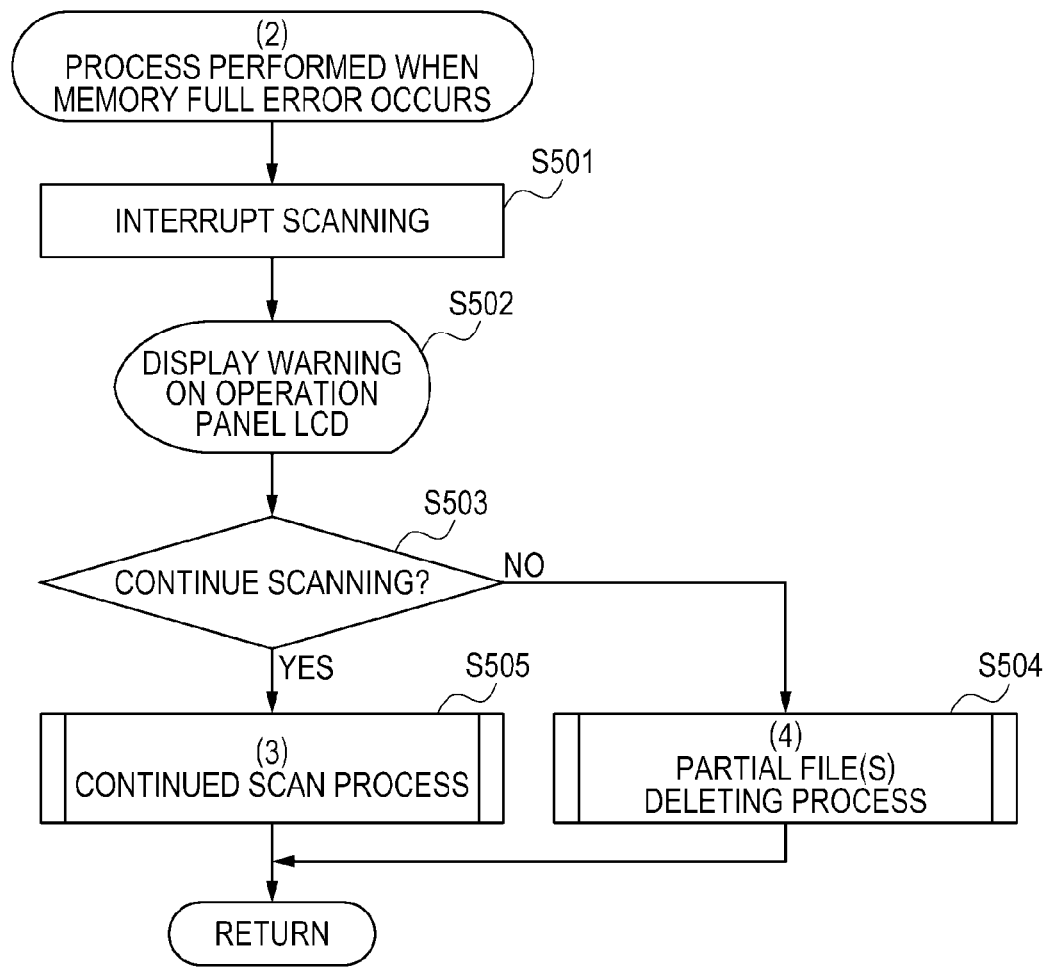
FIG. 5 is a flowchart illustrating a process performed when a memory full error occurs in the first embodiment of the present invention.

Referring to FIG. 5, a process performed when a memory full error occurs in a removable medium will be described. For example, a process performed in the case where "when a document having fives pages is to be scanned, a memory full error occurs while the fourth page is being stored on a removable medium" will be described, for example. As illustrated in the processes of FIGS. 3 to 4 described above, three pages of the five-page document are successfully stored on the storage medium; however, a memory full error occurs while the fourth page is being stored. The flow proceeds to step S408 in FIG. 4.

Figure 9:
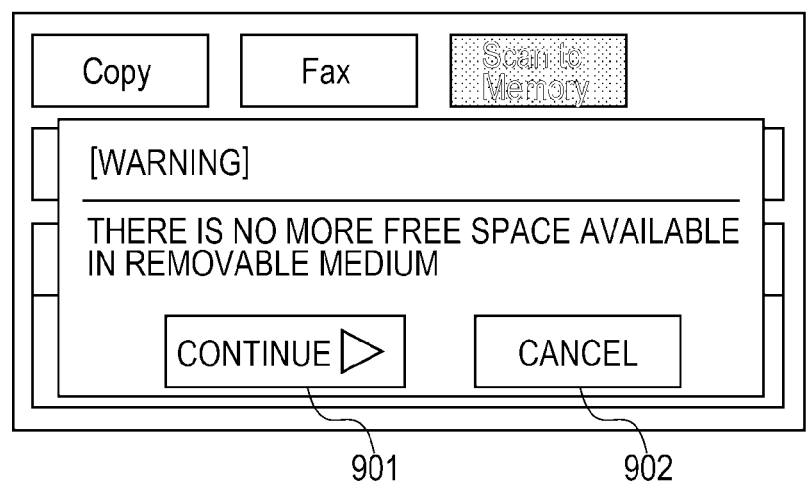
FIG. 9 is an illustration of an example of the screen displayed on the operation panel of the image forming apparatus illustrated in the first embodiment of the present invention.
Figure 10:
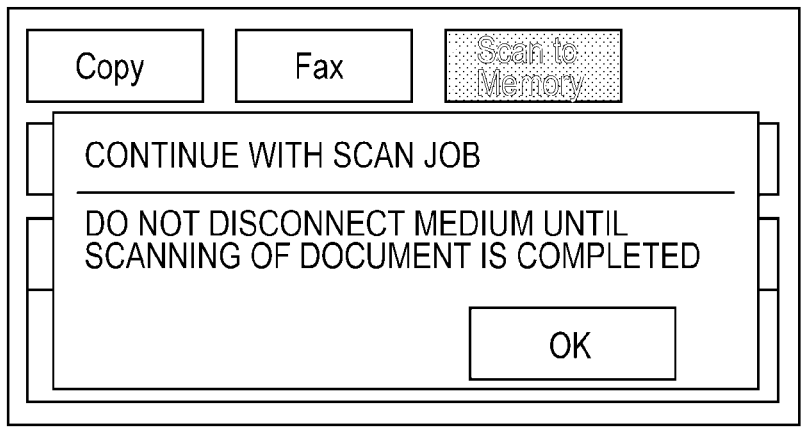
FIG. 10 is an illustration of an example of the screen displayed on the operation panel of the image forming apparatus illustrated in the first embodiment of the present invention.

When the MFP 100 detects a memory full error, the MFP 100 interrupts scanning of the next page or the fifth page of the document (S501), and displays a warning on the operation panel 222 (S502). Accordingly, the user is notified of the fact that storing of the document on the removable medium has not been completed. The user is then prompted to select one of the following: "to perform a rescue process and to continue with the job" or "to cancel the job". FIG. 9 illustrates an example of a warning screen displayed on the operation panel 222 in step S502. A button 901 for giving an instruction "to continue with the job" and a button 902 for giving an instruction "to cancel the job" are displayed so that the user can select one of these two buttons 901 and 902. When the user presses the button 901 to give an instruction "to continue with the job", the flow proceeds to a "continued scanning process" in step S505. In contrast, when the user presses the button 902 to give an instruction "to cancel the job", the flow proceeds to a "partial file(s) deleting process" in step S504. FIG. 10 illustrates an example of a screen displayed on the operation panel 222 when the user gives an instruction to continue with the job on the screen illustrated in FIG. 9 (when the user presses the button 901). This screen prompts the user not to disconnect the removable medium until scanning of the document is completed.

The scanned image data of the "fourth page" which has not been stored on the removable medium due to the occurrence of a memory full error is stored in a memory section such as the RAM 212 included in the main body of the MFP 100. When the user gives an instruction to continue with the job in step S503, the data is continuously stored. When the user gives an instruction to cancel the job, the image data is deleted.

Figure 6:
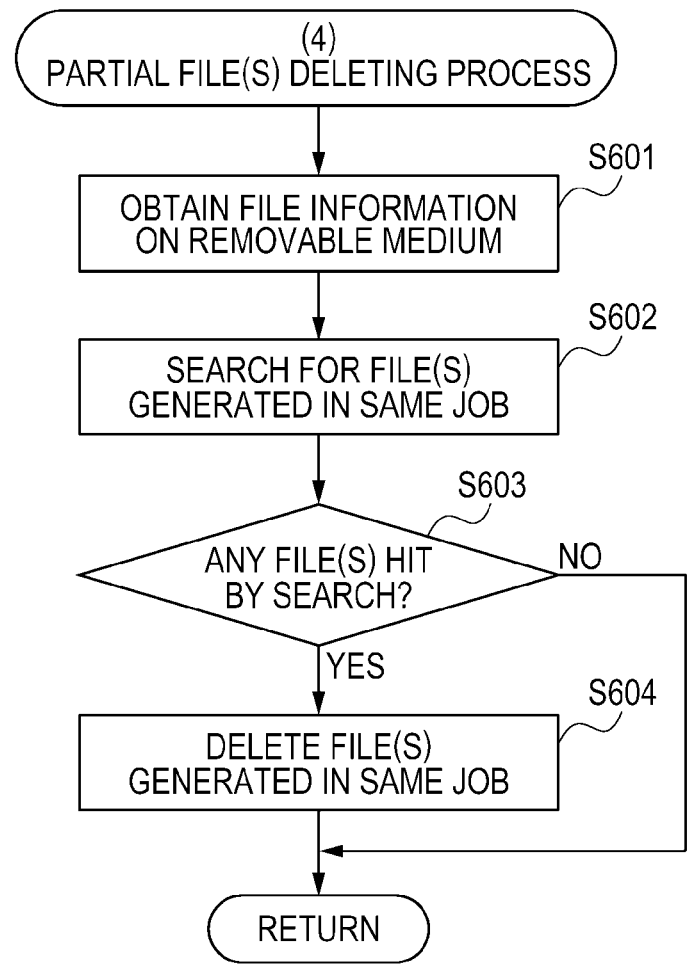
FIG. 6 is a flowchart illustrating a process of deleting a file(s) in the first embodiment of the present invention.

Referring now to FIG. 6, a process performed when the user gives an instruction to cancel the job on the screen illustrated in FIG. 9 will be described. According to the present embodiment, when a memory full error occurs in the removable medium while the scan to memory process is being performed, partial data stored on the removable medium is regarded as data unnecessary for the user and is automatically deleted. The flow of this process will be described below.

The CPU 211 accesses the removable medium and obtains file information stored on the removable medium (S601). When multiple files are stored on the removable medium, information on all these files stored on the removable medium are obtained. Next, on the basis of the obtained file information, a search for a file(s) generated during the scan to memory process performed this time is conducted (S602). Searching methods include a method of searching for a file having a file name including a job ID (job number) and a method of searching for a job ID (job number) that is included in advance in header information of a file. With the processing up to step S602, a file(s) generated during the scan to memory process performed this time is(are) specified from among files stored on the removable medium. When no corresponding file is detected at this point by conducting the foregoing search, the file deleting process is terminated (NO in S603). A file(s) hit by the search include(s) partial data generated by the scan to memory process performed this time and is(are) a file(s) unnecessary for the user. Therefore, the file(s) is(are) deleted from the removable medium (S604). Accordingly, data in a file format that cannot be analyzed is prevented from being accumulated in the removable medium.

Figure 7:
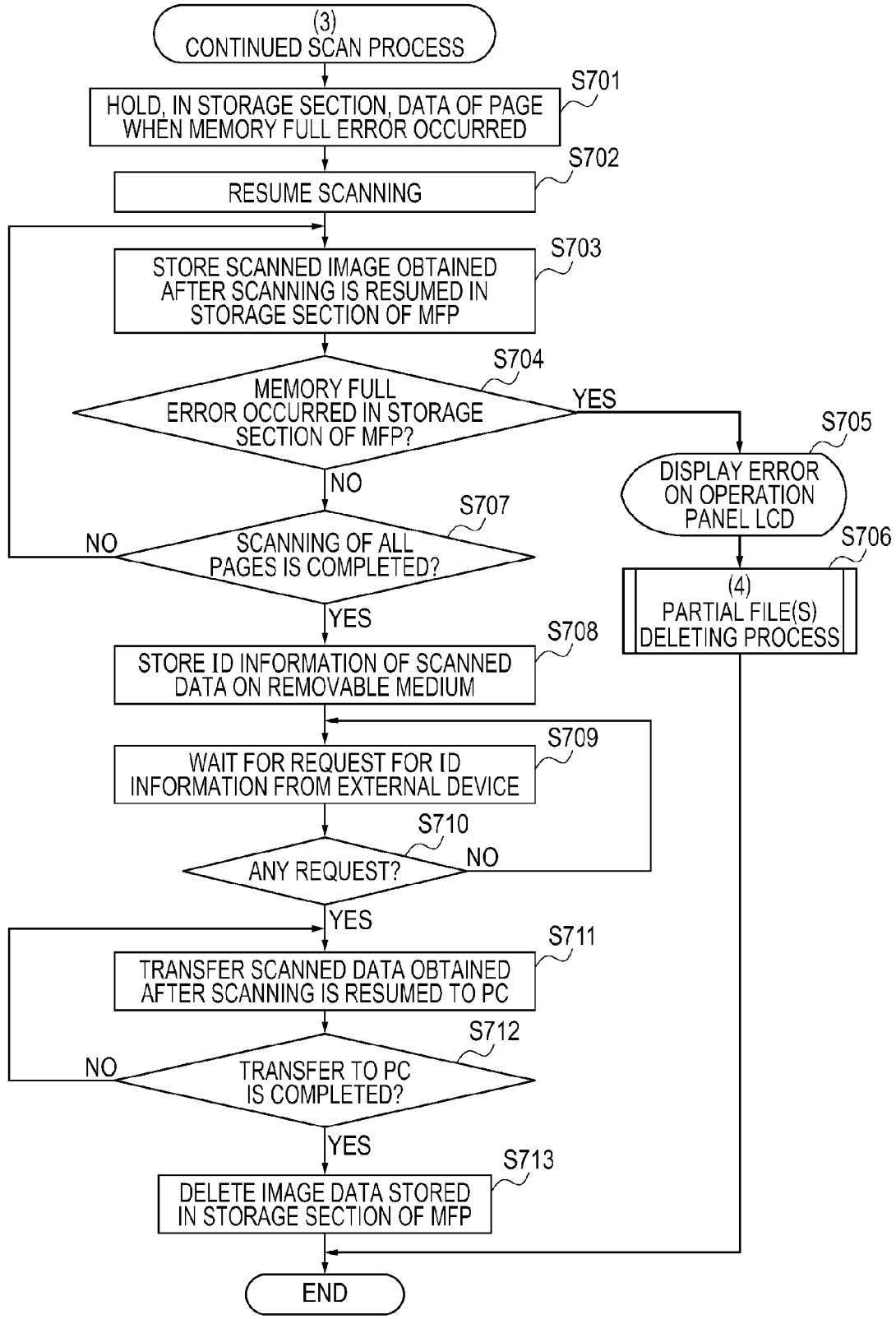
FIG. 7 is a flowchart illustrating a continued scanning process in the first embodiment of the present invention.

Referring now to FIG. 7, the flow of a process performed when the user gives an instruction to continue with the job on the screen illustrated in FIG. 9 will be described. As described above, image data of a page being stored when a memory full error occurred is stored in a memory section, such as the RAM 212, included in the main body of the MFP 100 (S701). The scanner resumes scanning the document (S702). The generated image data is stored in the same memory section as that in step S701 (S703). Accordingly, image data of a page(s) that is successfully stored on the removable medium is stored on the removable medium, and image data of the remaining page(s) that could not be stored on the removable medium is stored in the memory section of the MFP 100. That is, the user can hold the image data without restarting the scan to memory process from the beginning.

However, the capacity of the memory section included in the MFP 100 is limited. In particular, when the MFP 100 includes no large-capacity memory section such as a hard disk drive (HDD), a relatively small-capacity memory section such as a RAM is used. Before storing the remaining image data that could not be stored on the removable medium in the memory section of the MFP 100, the MFP 100 needs to determine whether a memory full error has occurred in the memory section. In step S704, the MFP 100 determines whether a memory full error has occurred in the memory section. When a memory full error has occurred in the memory section of the MFP 100, the MFP 100 displays an error message on the operation panel 222, and notifies the user thereof (S705). A process of deleting the image data stored on the removable medium (flow illustrated in FIG. 6) is executed (S706).

In contrast, when no memory full error occurs in the memory section of the MFP 100 (NO in S706) and when scanning of all pages is completed (YES in S707), the flow proceeds to step S708. In step S708, the MFP 100 stores, on the removable medium, information for obtaining, from an external device, the remaining image data that could not be stored on the removable medium. That is, the MFP 100 stores, on the removable medium, information needed for obtaining, from the external device, image data stored in the memory section of the MFP 100. This information at least includes identification information for identifying image data. In addition, this information includes, for image data on the removable medium, attribute information for specifying application software that handles the image data, a file name, and the like. When the external device communicates with the MFP 100 via a network, the information must include address information necessary for communicating with the MFP 100. Alternatively, the information may include a uniform resource locator (URL) indicating the image data stored in the memory section of the MFP 100. The user accesses, from the external device such as the host computer 203, the MFP 100 via a network or USB (not illustrated). At this time, the user connects the removable medium to this external device. Since the removable medium includes the information for obtaining the image data stored in the memory section of the MFP 100, the external device can read the information and access the MFP 100. The external device sends, to the MFP 100, a request for obtaining the image data stored in the memory section of the MFP 100.

After the identification information of the image data has been stored on the removable medium in step S708, the MFP 100 waits for an image data obtaining request from the external device (S709). As long as the memory section resources of the MFP 100 can be used, other processes (e.g., a copy process and a facsimile receiving process) are executable. When a request for obtaining the image data is received from the external device (YES in S710), the flow proceeds to step S711. In step S711, the MFP 100 refers to the identification information included in the received request, and specifies, in the memory section of the MFP 100, the image data identified by the identification information. The MFP 100 sends the specified image data to the external device, which has sent the obtaining request (S711). When the MFP 100 checks that sending to the external device is successfully completed (YES in S712), the MFP 100 deletes the image data stored in the memory section (S713), and terminates the process. Standby in step S709 may be performed by counting a predetermined time. When the predetermined time elapses, the image data stored in the memory section may be automatically deleted.

Figure 11:
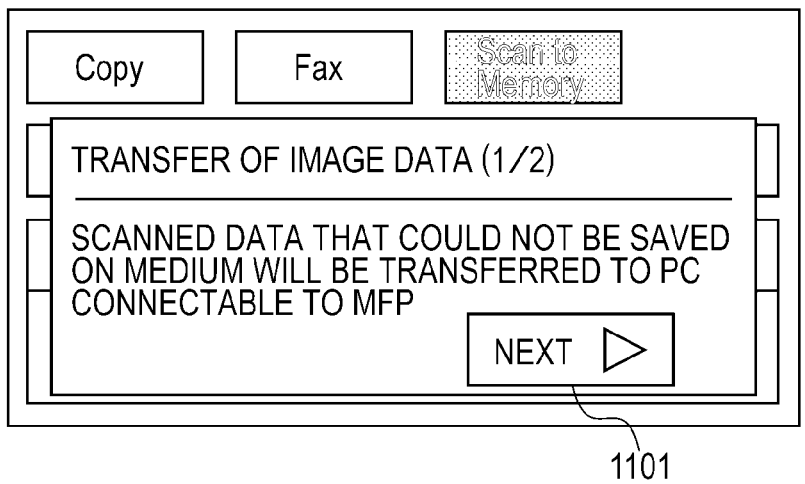
FIG. 11 is an illustration of an example of the screen displayed on the operation panel of the image forming apparatus illustrated in the first embodiment of the present invention.
Figure 12:
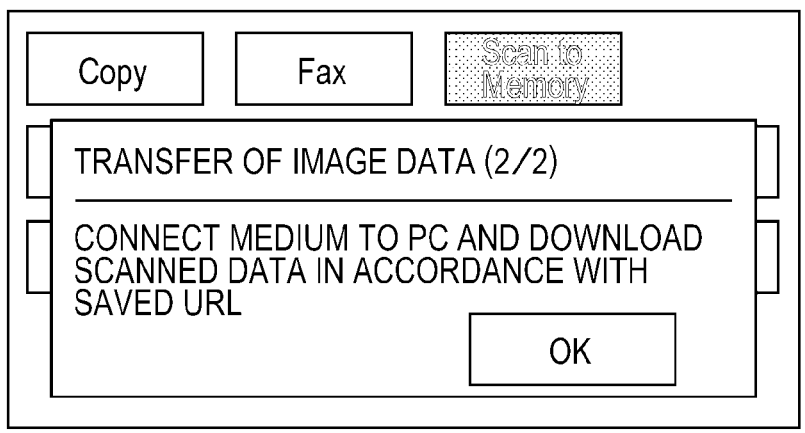
FIG. 12 is an illustration of an example of the screen displayed on the operation panel of the image forming apparatus illustrated in the first embodiment of the present invention.

FIG. 11 is an illustration of an example of the screen displayed on the operation panel 222 of the MFP 100 after scanning of all pages is completed in step S707. The screen in FIG. 11 displays that image data that could not stored on the removable medium is to be sent to the PC. FIG. 12 is an illustration of an example of the screen displayed on the operation panel 222 when a "next" button 1101 illustrated in FIG. 11 is pressed after the identification information of the image data is stored on the removable medium in step S708. After the user checks this display, the user disconnects the removable medium from the MFP 100, and connects the removable medium to the external device such as the PC.

As described above, according to the present embodiment, even when storage of data onto the removable medium is interrupted, unnecessary data is prevented from being left in the removable medium. That is, unnecessary image data stored on the removable medium can be deleted by processing performed by the MFP 100 without causing the user to be aware thereof, even when the user does not intentionally delete the data. Even when storage of data onto the removable medium is interrupted, if the user gives an instruction to continue processing, the remaining image data is stored in the memory section of the MFP 100. Information necessary for obtaining the image data is stored on the removable medium so that the external device such as the PC can obtain the image data. Accordingly, even when storage of data onto the removable medium is interrupted, the user can obtain the image data by using the external device, without going to the place of the MFP 100 and performing processing again.

Other Embodiments

In the foregoing embodiment, the case in which a memory full error occurs in a removable medium is described as an example of the case where storage of image data onto a removable medium cannot be completed. However, storage of image data may not be completed due to other factors. For example, storage of image data may not be completed due to a failure of the scanner section 221 of the MFP 100, or storage of image data may be interrupted due to other errors.

In the foregoing embodiment, when a memory full error occurs in the removable medium, only the image data thereafter is stored in the memory section of the MFP 100. However, image data of all pages including image data that has already been stored on the removable medium may be stored in the memory section of the MFP 100. In this way, when the external device is to obtain the image data in the memory section, the external device can obtain the image data of all pages. When the image data of all pages is to be stored in the memory section of the MFP 100, even when the user gives an instruction "to continue with the job" on the screen in FIG. 9, the image data stored on the removable medium is deleted. This is because the external device can re-obtain the image data of all pages from the MFP 100. That is, even in this case, the image data stored on the removable medium becomes unnecessary data. Accordingly, when the external device is to obtain image data from the MFP 100, the image data is prevented from being separated into multiple files (page(s) that is(are) stored on the removable medium and page(s) that is(are) obtained from the memory section of the MFP 100).

In the foregoing embodiment, the case where image data generated by the scanner section 221 of the MFP 100 is stored on the removable medium has been described. However, the present invention is applicable not only to image data generated by a scanner, but also to other data. For example, the present invention is applicable to the case where the MFP 100 has a facsimile function, and the MFP 100 receives image data sent via facsimile from another device and stores the received image data on the removable medium.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-321635, filed Dec. 17, 2008, which is hereby incorporated by reference herein in its entirety.

The invention claimed is:

1. An image processing apparatus comprising:
    a scanning unit configured to scan a document including a plurality of pages;
    a holding unit configured to hold image data of the document of the plurality of pages scanned by the scanning unit;
    a connection unit configured to connect a removably connectable storage device;
    a storage control unit configured to store, in the removably connectable storage device connected by the connecting unit, the image data of the document of the plurality of pages held in the holding unit;
    a searching unit configured to search, from image data which has been stored in the removably connectable storage device, for image data which corresponds to a part of the document of the plurality of pages
    a determining unit configured to determine, after storage of the image data of the document of the plurality of pages is started by the storage control unit, whether or not the storage of the image data of the document of the plurality of pages is completed; and
    a deleting unit configured to delete, in a case where it is determined by the determining unit that the storage of the image data of the document of the plurality of pages is not completed, the image data found in the search by the searching unit,
    wherein the deleting unit does not perform deletion of the image data which has been stored in the removably connectable storage device in a case where it is determined by the determining unit that the storage of the image data of the document of the plurality of pages is completed.

2. The image processing apparatus according to claim 1, further comprising:
    a memory control unit configured to store, in a case where it is determined by the determining unit that the storage of the image data of the document of the plurality of pages is not completed, a part of the image data of the document of the plurality of pages that has not been stored by the storage control unit in a memory unit included in the image processing apparatus;
    a second storage control unit configured to store information for obtaining the image data stored in the memory unit in the removably connectable storage device connected by the connection unit; and
    a sending unit configured to send the image data stored in the memory unit upon receipt of a request from an external device for obtaining the image data stored in the memory unit wherein the memory is removably connected to the image processing apparatus.

3. The image processing apparatus according to claim 2, further comprising
    a selection unit configured to cause a user to select whether to continue processing in the case where it is determined by the determining unit that the storage of the image data of the document of the plurality of pages is not completed, wherein, when the user has selected to continue processing, the image data is stored by the memory control unit, and the information is stored in the removably connectable storage device by the second storage control unit, and wherein, when the user has selected not to continue processing, the image data found in the search by the searching unit is deleted from the removably connectable storage device by the deleting unit.

4. The image processing apparatus according to claim 2, wherein in a case where it is determined by the determining unit that the storage of the image data of the document of the plurality of pages by the memory control unit is not completed, the image data that has been stored by the storage control unit is deleted from the removably connectable storage device by the deleting unit the searching unit is configured to search for the at least one file based on a job ID.

5. The image processing apparatus according to claim 4, wherein the case where it is determined by the determining unit that the storage of the image data of the document of the plurality of pages is not completed is a case where there becomes no more free space available in the removably connectable storage device while storage is being performed by the storage control unit, and the case where it is determined by the determining unit that the storage of the image data of the document of the plurality of pages started by the memory control unit is not completed is a case where there becomes no more free space available in the memory unit while the storage is being performed by the memory control unit.

6. A control method for controlling an image processing apparatus which has a connection unit configured to connect a removably connectable storage device, the method comprising:

scanning a document including a plurality of pages;

holding, in a memory of the image processing apparatus, image data of the scanned document of the plurality of pages;

storing, in the removably connectable storage device connected by the connecting unit, the image data of the document of the plurality of pages held in the memory;

searching, from image data which has been stored in the removably connectable storage device, for image data which corresponds to a part of the document of the plurality of pages; and determining, after storage of the image data of the document of the plurality of pages is started, whether or not the storage of the image data of the document of the plurality of pages is completed; and deleting, in a case where it is determined that the storage of the image data of the document of the plurality of pages is not completed, the image data found in the searching, wherein deletion of the image data which has been stored in the removably connectable storage device is not performed in a case where it is determined that the storage of the image data of the document of the plurality of pages is completed.

7. A non-transitory computer readable storage medium storing a computer program for causing an image processing apparatus to execute a method, the image processing apparatus having a connection unit configured to connect a removably connectable storage device, the method comprising:

scanning a document including a plurality of pages;

holding, in a memory of the image processing apparatus, image data of the scanned document of the plurality of pages;

storing, in the removably connectable storage device connected by the connecting unit, the image data of the document of the plurality of pages held in the memory;

searching, from image data which has been stored in the removably connectable storage device, for image data which corresponds to a part of the document of the plurality of pages;

determining, after storage of the image data of the document of the plurality of pages is started, whether or not the storage of the image data of the document of the plurality of pages is completed; and deleting, in a case where it is determined that the storage of the image data of the document of the plurality of pages is not completed, the image data, wherein deletion of the image data which has been stored in the removably connectable storage device is not performed in a case where it is determined that the storage of the image data of the document of the plurality of pages is completed.

* * * * *